Figure 1:
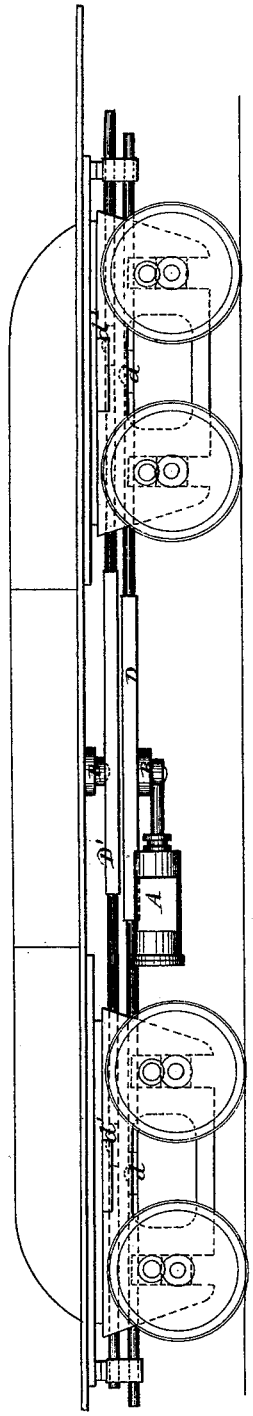

4 Sheets—Sheet 1.

J. APSEY.
Steam Street-Car.

No. 218,467. Patented Aug. 12, 1879.

Attest:
J. Henry Kaiser
J. A. Rutherford

Inventor:
Joseph Apsey
By James L. Norris.
Atty.

4 Sheets—Sheet 2.

J. APSEY.
Steam Street-Car.

No. 218,467. Patented Aug. 12, 1879.

Attest:
J. Henry Kaiser
J. A. Rutherford

Inventor:
Joseph Apsey.
By James L. Norris, Atty.

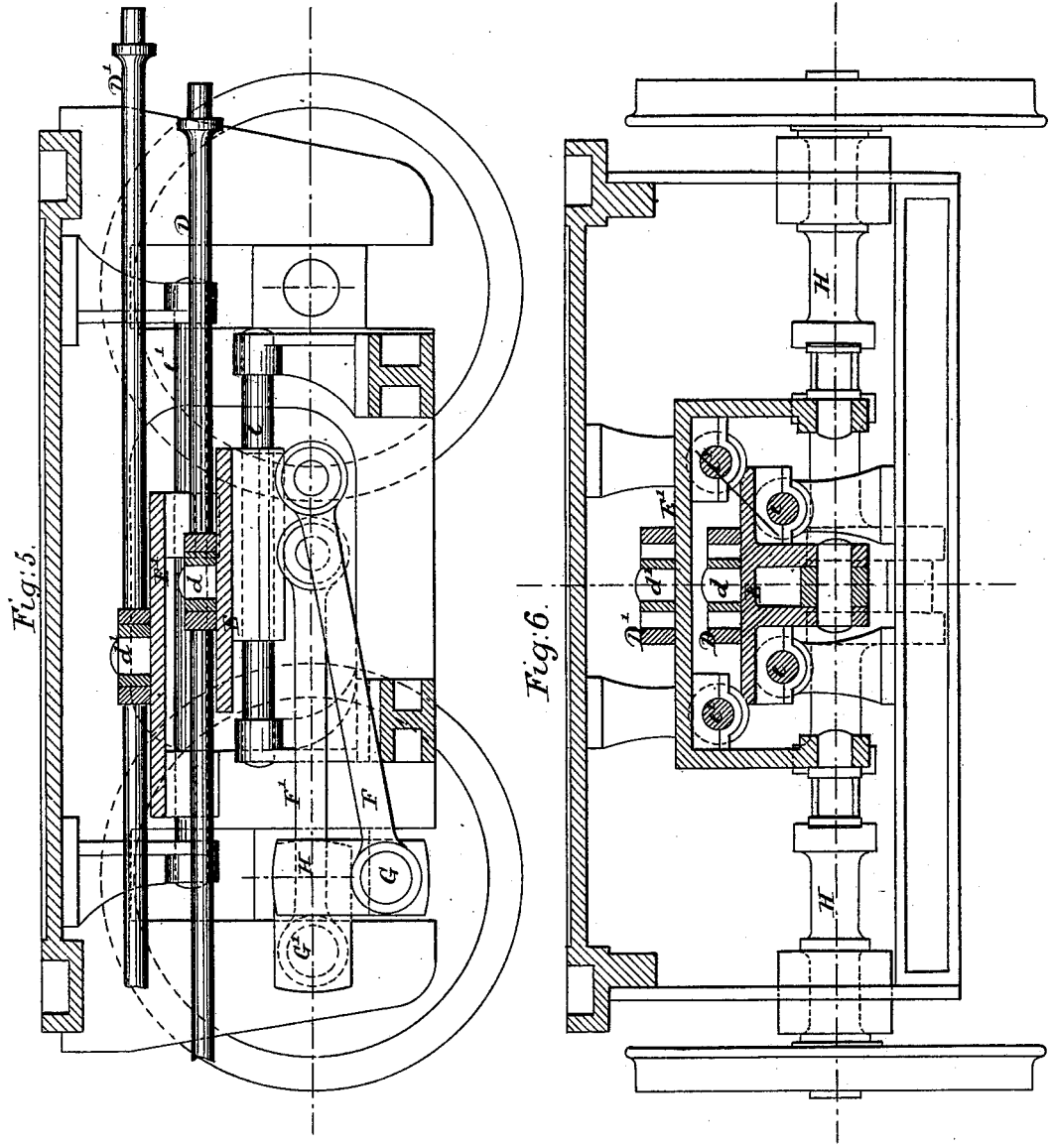

4 Sheets—Sheet 4.
J. APSEY.
Steam Street-Car.
No. 218,467. Patented Aug. 12, 1879.
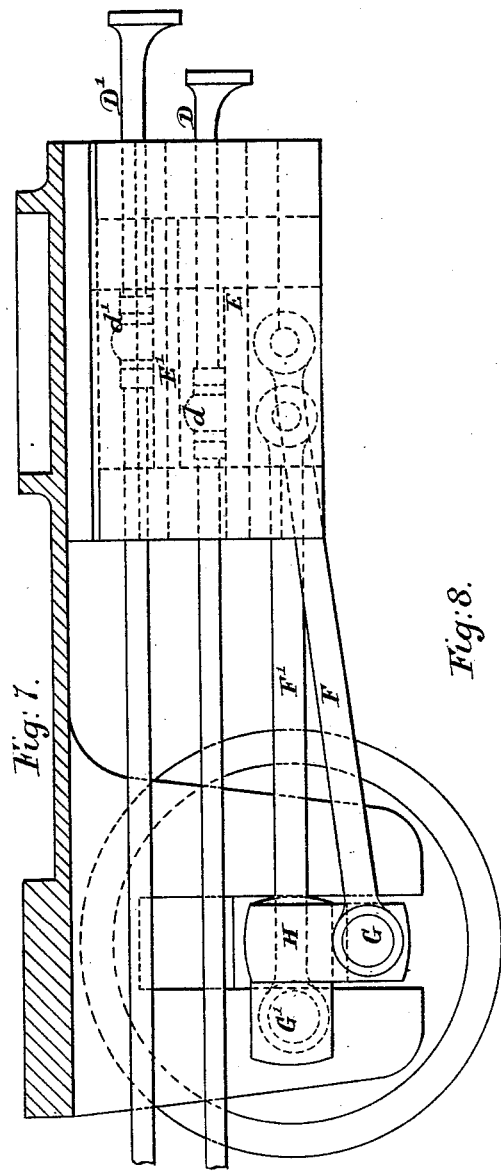
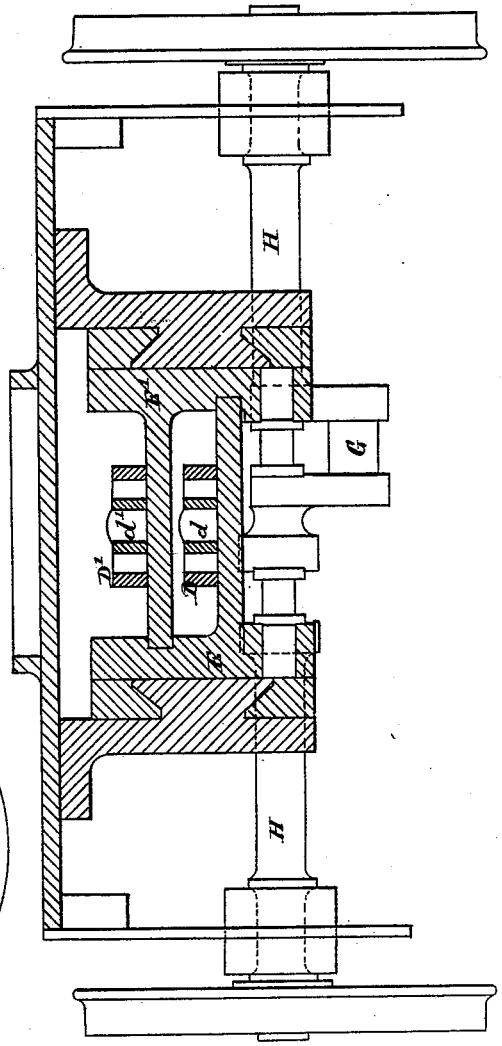
Attest:
J. Henry Kaiser
J. A. Rutherford
Inventor:
Joseph Apsey
By James L. Norris.
Att'y.

UNITED STATES PATENT OFFICE.

JOSEPH APSEY, OF NO. 22 WATERLOO BRIDGE ROAD, COUNTY OF SURREY, ENGLAND.

IMPROVEMENT IN STEAM STREET-CARS.

Specification forming part of Letters Patent No. 218,467, dated August 12, 1879; application filed June 25, 1879; patented in England, October 29, 1877.

*To all whom it may concern:*

Be it known that I, JOSEPH APSEY, of No. 22 Waterloo Bridge Road, in the county of Surrey, England, engineer, have invented an Improvement in Wheeled Vehicles worked by steam, compressed air, or other fluid under pressure; and do hereby declare that the following description, taken in connection with the accompanying sheets of drawings, hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention relates to wheeled vehicles, such as tramway-cars, locomotives, traction-engines, and the like, propelled by steam, compressed air, or other fluid under pressure, and has for its object such an arrangement and construction of the engines and road-wheels that while the engines are in a fixed position at some distance from the wheels these wheels are themselves mounted on bogie-frames, so as to give facility for the vehicle running on curves, and all the wheels may be made to act as driving-wheels. For this purpose, according to one construction, I fix the cylinders of the engine on the under side of the floor or platform of the vehicle at or about the middle of the length thereof. Near each end of the platform I mount a pair of axles with four wheels on bogie-frames, the wheels on each frame being coupled, if desired, by crank-pins and connecting-rods.

For driving these wheels from the engines, and at the same time allowing the bogies to turn partly round on their vertical axes or perch-pins, I arrange driving-gear in the following manner: On each bogie-frame I fit a pair of slides working horizontally through a distance equivalent to the stroke of the engines, or double the crank-throw. One of these slides I connect by a connecting-rod to a crank on one of the wheel-axles, and the other I likewise connect to a crank on the same axle, or on an axle coupled thereto at or about right angles to the former crank.

The engines work a pair of sliding bars extending lengthwise from bogie to bogie. One of these bars is linked at each end to a pin on one of the bogie-slides, and the other bar is in like manner linked at each end to a pin on the other bogie-slide, and these pins are in such a position on the slides that when the slides are at mid-stroke the pins are in vertical line with the perch-pins of the bogies. The engines causing the two longitudinal bars to reciprocate, these cause the bogie-slides also to reciprocate, and the axles are thereby driven even when they are made to radiate more or less to either hand by the locking of the bogie-frames.

A like construction and arrangement apply when the bogies have two wheels instead of four. Also, the wheels of only one bogie may be driven in the manner described.

In the drawings, Figure 1 represents a side view, and Fig. 2 a plan looking from below, of the under framing or platform of a tramway-car with one arrangement of the driving-gear according to my invention. Figs. 3 and 4 are similar views, showing a modified arrangement of such driving-gear. In both these cases there are two bogies, one near each end of the vehicle, the driving-wheels on both being driven from engines situated nearly under the middle of the vehicle. Fig. 5 represents a side view, and Fig. 6 a transverse section, of one of the bogies shown in Figs. 1 and 2; and Figs. 7 and 8 are similar views of one of the bogies shown in Figs. 3 and 4.

Figure 2:
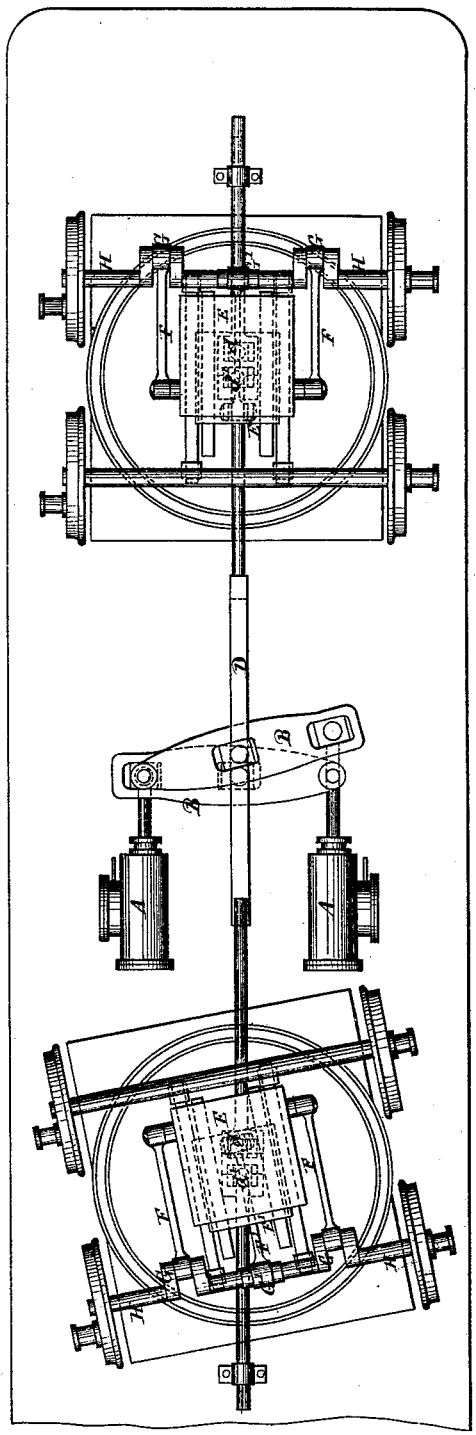
Figure 3:
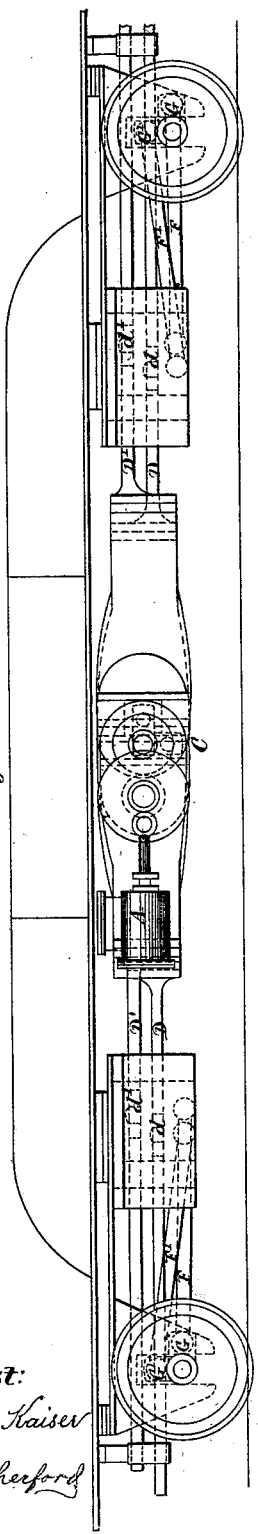
Figure 4:
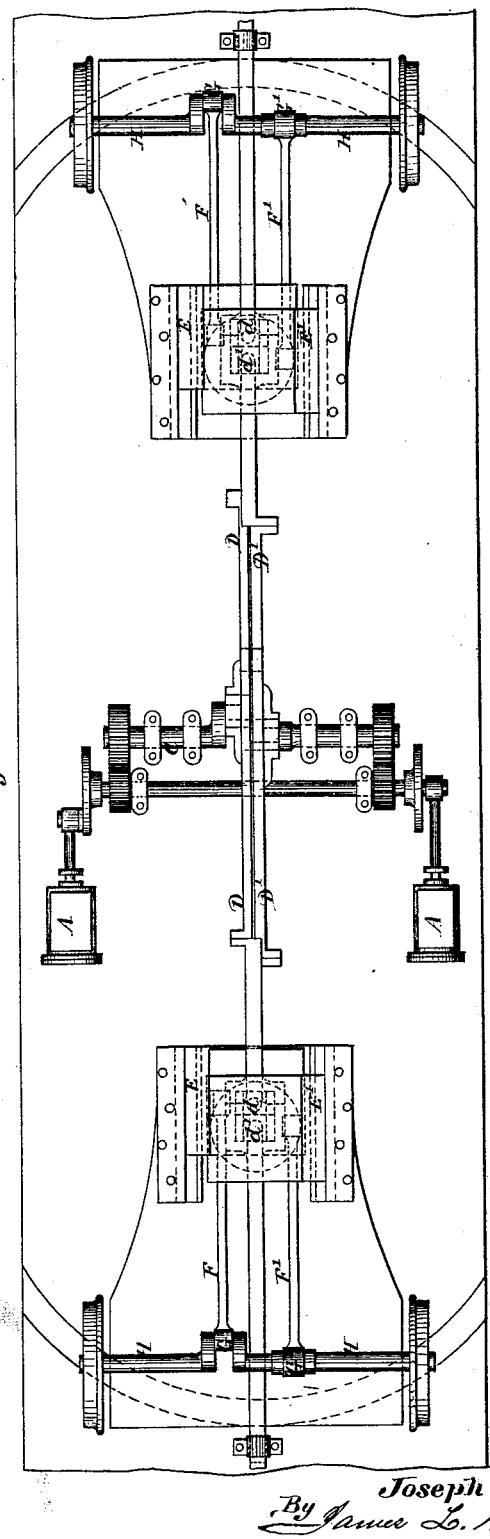

It is to be understood, however, that the driving-gear shown in Figs. 5 and 6 is applicable to the arrangement of Figs. 3 and 4, and also that the driving-gear shown in Figs. 7 and 8 is applicable to the arrangement of Figs. 1 and 2, the details being suitably modified.

A A are the cylinders of the engine, the pistons of which, either by means of beams B B, as in Figs. 1 and 2, or by means of geared cranks C, as in Figs. 3 and 4, give reciprocating motion to two sliding bars or rods, D D', which, by means of pins $d$ $d'$, are linked, respectively, to slides E E', fitted in the bogie-frames, the pins $d$ $d'$ being capable of traversing in slots formed in the rods D D' in a direction at right angles to the longitudinal axis, as shown. The pins $d$ $d'$ are in such positions that when the sliding bars D D' and slides E E' are at half-stroke the axes of these pins are in the same vertical line with the axis of the pivot or perch pin on which the bogie-frame turns. The slides E E' are guided so as to move to and fro horizontally, and for this purpose they may slide along round rods $e\ e'$, as shown in Fig. 6, or in dovetail guides, as shown in Fig. 8, or they may be guided in any other suitable manner. One of the slides E is connected by a connecting-rod, F, to one of the cranks G on the shaft H of the driving-wheels, or it may be connected to two cranks, as shown in Fig. 2, and the other slide, E', is in like manner connected to another crank, G', on the driving-axle, the latter crank, G', being set nearly at right angles to the former crank, G.

It will be seen that the arrangement shown in Figs. 1, 2, 5, and 6 is applicable when four-wheeled bogies are employed, turning on their centers. In such a case the wheels of each bogie may be coupled together by crank-pins and connecting-rods, in the usual manner; and when the four wheels of either bogie are thus coupled, the arrangements for driving the wheels of the other bogie from the engine may be dispensed with, the second bogie being reserved for the application of brakes.

The arrangement shown in Figs. 3, 4, 7, and 8 is applicable to two-wheeled bogies turning on perch-pins which are at some distance within the axles, respectively.

Having thus described the nature of my invention and the best means I know of carrying it out in practice, I claim—

1. In wheeled vehicles propelled by fluid-pressure, a crank-axle carrying the driving-wheels and mounted on a swiveling bogie-frame, on which are slides driving the crank-axle, and worked by sliding bars caused to reciprocate by engines fixed on the platform or framing of the vehicle, the connection between the sliding bars and the slides being such that while the former always moves in a direction parallel with the longitudinal axis of the vehicle, the latter can move in a direction either parallel with or at a variable angle to such line, substantially as and for the purposes described.

2. The combination of the sliding bars D D', worked by fluid-pressure engines, and linked to the slides E E', the connecting-rods F F', and cranks G G' on the axle H of a pair of driving-wheels, the slides E E' and axle H being mounted on a bogie-frame, substantially as herein described.

In testimony whereof I have signed my name to this specification in the presence of two subscribing witnesses.

JOSEPH APSEY.

Witnesses:
CHARLES DENTON ABEL,
OLIVER IMRAY.